(12) United States Patent
Dewar et al.

(10) Patent No.: US 6,348,171 B1
(45) Date of Patent: Feb. 19, 2002

(54) DROOL CONTROL APPARATUS AND METHOD

(75) Inventors: Neil Dewar, Georgetown; Denis Babin, Acton, both of (CA)

(73) Assignee: Mold Masters Limited, Toronto (CA)

( * ) Notice: Subject to any disclaimer, the term of this patent is extended or adjusted under 35 U.S.C. 154(b) by 0 days.

(21) Appl. No.: 09/309,648

(22) Filed: May 11, 1999

(51) Int. Cl.$^7$ .......................... B29C 45/28; B29C 45/30
(52) U.S. Cl. ................. 264/297.2; 264/328.8; 264/328.9; 425/562; 425/588
(58) Field of Search ............ 264/328.1, 297.2, 264/328.8, 328.9, 39; 425/562, 563, 572, 588, 564

(56) References Cited

U.S. PATENT DOCUMENTS

| | | | | |
|---|---|---|---|---|
| 2,514,390 A | * | 7/1950 | Hagan | |
| 2,928,125 A | * | 3/1960 | Smucker et al. | 264/39 |
| 3,146,282 A | * | 8/1964 | Ninneman | |
| 3,270,115 A | * | 8/1966 | Nouel | 264/328.13 |
| 3,315,899 A | * | 4/1967 | Quarve | |
| 3,902,665 A | * | 9/1975 | Hendry | |
| 4,674,968 A | * | 6/1987 | Durst | 425/562 |
| 5,012,839 A | * | 5/1991 | Rogers et al. | 425/563 |
| 5,720,433 A | * | 2/1998 | Forker | |
| 5,968,562 A | * | 10/1999 | Schad et al. | 425/588 |
| 5,975,127 A | * | 11/1999 | Dray | 425/563 |
| 6,135,757 A | * | 10/2000 | Jenko | 425/562 |

FOREIGN PATENT DOCUMENTS

| | | |
|---|---|---|
| JP | 60240425 | 5/1984 |
| JP | 05185473 | 1/1992 |
| WO | WO 99/54109 | 10/1999 |

* cited by examiner

Primary Examiner—Jill L. Heitbrink
(74) Attorney, Agent, or Firm—Bereskin & Parr (57) ABSTRACT

A drool control apparatus having a piston disposed in a melt passage of a mold. The piston is moveable between a bypass position, where pressurised melt is permitted to flow past the piston to at least one nozzle, and a compression position, where the melt downstream of the piston is decompressed to inhibit drool at the nozzle.

27 Claims, 9 Drawing Sheets

DROOL CONTROL APPARATUS AND METHOD

FIELD OF THE INVENTION

This invention relates generally to injection molding and, more particularly, to an apparatus and method for controlling gate drool.

BACKGROUND OF THE INVENTION

It is well known in thermally-gated hot runner injection molding systems that runner decompression prior to, or contemporaneous with, parting the mold advantageously reduces gate melt drool. Gate drool adversely affects the quality of succeeding parts and should therefore be avoided.

In typical injection molding systems, it has been found that decompressing the molding machine greater auger prior to, or upon, parting the mold advantageously reduces gate drool. Decompression decreases the pressure within the hot runner in the mold, thereby removing the back pressure which causes the melt to drop from the gate upon mold parting. There are instances however where it is impractical or even impossible to use auger decompression to control gate drool. One such instance is in stack molding.

Stack molding is known to provide significant advantages in injection molding of plastic parts, notably among which is increased production output without a corresponding increase in the size of the mold. The higher cavitation and longer melt flow lengths required in hot runner stack molds, however, result in increased pressure losses within the system. These increased pressure losses require increased injection molding pressures to overcome the losses to adequately fill and pack all mold cavities in the mold. Detrimentally, the pressure losses caused by the extensive runner system also results in a decreased ability to achieve satisfactory decompression of the stack mold to prevent drool simply by decompressing the injection auger. Although sufficient decompression may be achieved by releasing auger pressure, the pressure losses in the hot runner system increase the response time of the runner system to the decompression, detrimentally affecting the overall cycle time required for a single molding operation.

Examples of mechanisms for controlling gate drool in single or multi-layered molds are disclosed in U.S. Pat. Nos. 4,473,347 (Terashima) and 5,458,843 (Brown, et al) and Swiss Patent 625,461 (Hotz). These patents disclose various mechanisms for increasing the volume of a melt passage by varying its length or width to achieve a desired decompression. The mechanisms utilize displaceable valve members, expansible pistons or volume increasing cylinder arrangements to create the desired decompression.

There is need for an improved apparatus and method for controlling drool in a mold that is relatively simple in its construction and effective in its operation.

SUMMARY OF THE INVENTION

The present invention provides an apparatus and method for achieving increased decompression within a melt passage to impede mold cavity gate drool particularly in thermally gated mold applications.

In one aspect the invention provides a drool control apparatus for a mold, the apparatus comprising:
  a melt passage having a first end for receiving a pressurised melt and a second end for communicating with at least one gated nozzle;
  a piston disposed in the melt passage; and
  means for moving said piston in said melt passage between a bypass position, where said melt is permitted to flow through said melt passage around said piston, and a compression position, where said piston decompresses said melt downstream of said piston to control drool at said at least one gated nozzle.

In another aspect the invention provides a stack injection molding apparatus having a stationary platen and a moving platen, the moving platen moving between an open position and a closed position and cooperating with the stationary platen to define at least one mold cavity when in said closed position, the molding apparatus comprising:
  a first runner passage in the stationary platen for supplying a pressurised melt flow to the moving platen;
  a second runner passage in the moving platen having a first end in communication with the first runner passage when the moving platen is in the closed position, and a second end in communication with the mold cavity;
  a valve unit disposed in the second runner passage, the valve unit having a piston connected thereto; and
  an actuator for moving the valve unit in the second runner passage between a bypass position and a compression position, wherein, when the valve unit is in its bypass position, the pressurised melt may flow substantially unimpeded through the second passage to the mold cavity and, when the valve unit is in its compression position, the melt flow through the second passage is at least partially impeded by the piston, whereby the movement of the valve unit from its bypass position to its compression position decompresses the melt downstream of the piston by displacing melt upstream of the piston.

In another aspect the invention provides a stack injection molding apparatus for conducting pressurised melt from a stationary platen to a moving platen moveable between an open position and a closed position comprising:
  (a) a first runner passage in the stationary platen communicatively connecting a molding machine inlet to a first gate, and
  (b) a melt flow control valve unit disposed in the moving platen, the valve unit having a controllable second gate, a second runner passage extending from the second gate and a piston disposed in the second runner passage, the valve unit being located in the moving platen in a position where in the first and second gates are in conducting communication when the moving platen is in the closed position,
  the valve unit being actuatable to open and close the second gate and move the piston within the second runner passage, while the moving platen is in the closed position, to selectively provide a flow of pressurised melt from the first runner passage to the second runner passage and to selectively decompress the pressurised melt in the second runner passage downstream of the piston.

In another aspect of the invention provides a method of controlling mold cavity gate leakage in a molding apparatus when a mold is parted comprising the steps of:
  (a) introducing a flow of pressurised melt to a runner passage for subsequent transfer to at least one molding cavity to perform a molding operation,
  (b) upon completion of the molding operation, stopping the flow of pressurised melt in the runner passage by moving a piston located within the passage from a bypass chamber, where pressurised melt is permitted to flow around the piston in the passage, to a compression zone, where the passage is at least partially sealed by the piston, (c) moving the piston upstream in the compression zone to decompress the runner passage downstream of the piston sufficiently to control leakage at said mold cavity gate.

BRIEF DESCRIPTION OF THE DRAWINGS

For a better understanding of the present invention, and to show more clearly how it may be carried into effect, reference will now be made by way of example to the accompanying drawings.

The drawings show preferred embodiments of the present invention, in which.

DETAILED DESCRIPTION OF THE PREFERRED EMBODIMENTS

Figure 1:
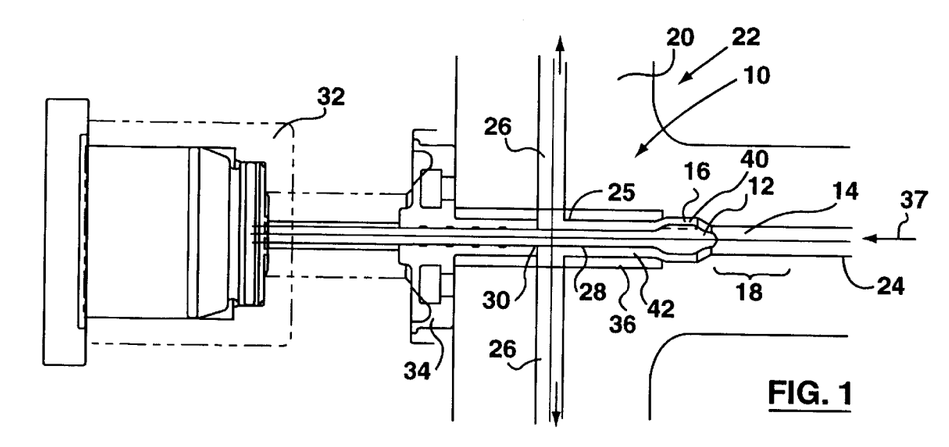
FIG. 1 is a sectional view of a drool control apparatus for a mold in accordance with the present invention, shown in a bypass position.
Figure 2:
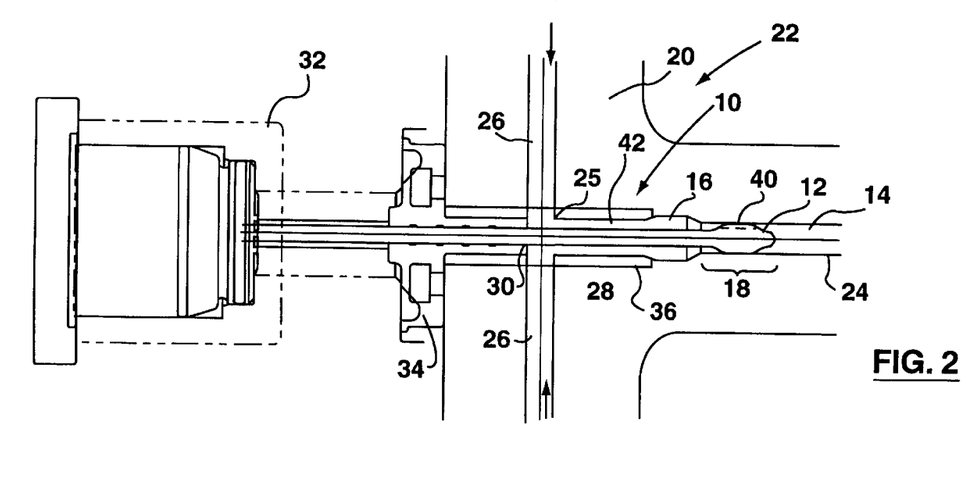
FIG. 2 is the sectional view of the drool control apparatus of FIG. 1, shown in a compression position.

Referring to FIGS. 1 and 2, a drool control apparatus in accordance with the present invention is shown generally at 10. The apparatus includes a piston 12 (also referred to herein as a compression member) that is displaceable in a melt passage 14 between a bypass chamber 16 and a compression zone 18.

The apparatus 10 is located within a manifold 20 of a single or multi-layered mold 22 (only a portion of which is depicted in FIGS. 1 and 2). The melt passage 14 has a first end 24 that receives a pressurised melt from an injection unit (not shown) and a second end 25 that conducts the melt to one or more secondary passages 26. Secondary passages 26 lead to one or more thermally-gated nozzles (not shown) for injecting the melt into one or more cavities (not shown).

The piston 12 is located at one end of a shaft 28 the other end of which extends through a sealed aperture 30 out of the melt passage 14 and connects to an actuator 32 controlled by a central processing unit (CPU) (not shown). The piston 12 and shaft 28 are supported centrally within the melt passage 14 by a bushing 34 and a plug 36 disposed in the manifold 20.

The bypass chamber 16 is defined in the melt passage 14 upstream of the second end 25. The bypass chamber 16 is sized to allow melt to flow in direction 37 around the piston 12 when the piston 12 is in a bypass position as shown in FIG. 1. The piston 12 and bypass chamber 16 preferably each have a corresponding tapered profile to allow a relatively non-turbulent flow of melt around the piston 12 while in the bypass position.

The compression zone 18 is defined in the melt passage 14 immediately upstream of the bypass chamber 16. The compression zone 18 is sized to receive the piston 12 such that movement of the piston 12 axially in melt passage 14 from the bypass chamber 16 through the compression zone 18 to a compression position as shown in FIG. 2 compresses the melt upstream of the piston 12 and decompresses the melt downstream of the piston 12. The distance that the piston 12 is moved in the compression zone 18 affects the amount of decompression imparted on the melt downstream of the piston 12. Thus the length of shaft 28 or the length of the stroke imparted by actuator 32 may be adjusted to achieve the desired decompression.

A longitudinal cutout 40 is defined in the piston 12 to permit some melt to flow past the piston 12 as it is stored upstream in the compression zone 18 to the compression position to reduce the resistance pressure acting on the piston 12.

Downstream of the bypass chamber 16, between the second end 25 and the bypass chamber 16, an enlarged portion 42 is preferably defined in the melt passage 14 to account for the volume of space taken up by the shaft 28. Preferably the cross sectional area of the enlarged position 42, excluding the shaft 28, is generally equal to the cross sectional area of the bypass chamber 16, excluding the piston, and the cross sectional area of the compression zone excluding the piston. In this manner, pressurised melt is permitted to flow at a relatively constant rate through the melt passage 14 when the piston 12 is in the bypass position.

In use, pressurised melt is permitted to flow from the injection unit (not shown) to the melt passage 14. When the piston 12 is in the bypass position, melt is permitted to flow through the compression zone 18, through the bypass chamber 16 around the piston 12, through the enlarged portion 42 around the shaft 28, through secondary passages 26 and to the thermally gated nozzles (not shown) for injection into the cavities (not shown). After the injection and packing cycles are completed, during or prior to the parting of the platens (not shown) for ejecting the molded parts, the actuator 32 is actuated by the CPU to move the piston 12 from the bypass position to the compression position. As the piston 12 moves through the compression zone 18, the melt located upstream of the piston 12 is compressed and the melt located downstream of the piston 12 is decompressed. The decompression of melt downstream of the piston 12 is translated along secondary passages 26 and acts to control drool from leaking from the thermally gated nozzles. Once it is time to repeat the molding cycle, the actuator 32 is actuated by the CPU to return the piston 12 to the bypass position for permitting a subsequent flow of melt through the melt passage 14.

Advantageously, the internal dimensions (length and width) of the melt passage 14 remain constant as the melt is decompressed. Mechanisms are thus not required to vary the dimensional characteristics of the melt passage 14 to achieve the desired decompression.

Figure 3:
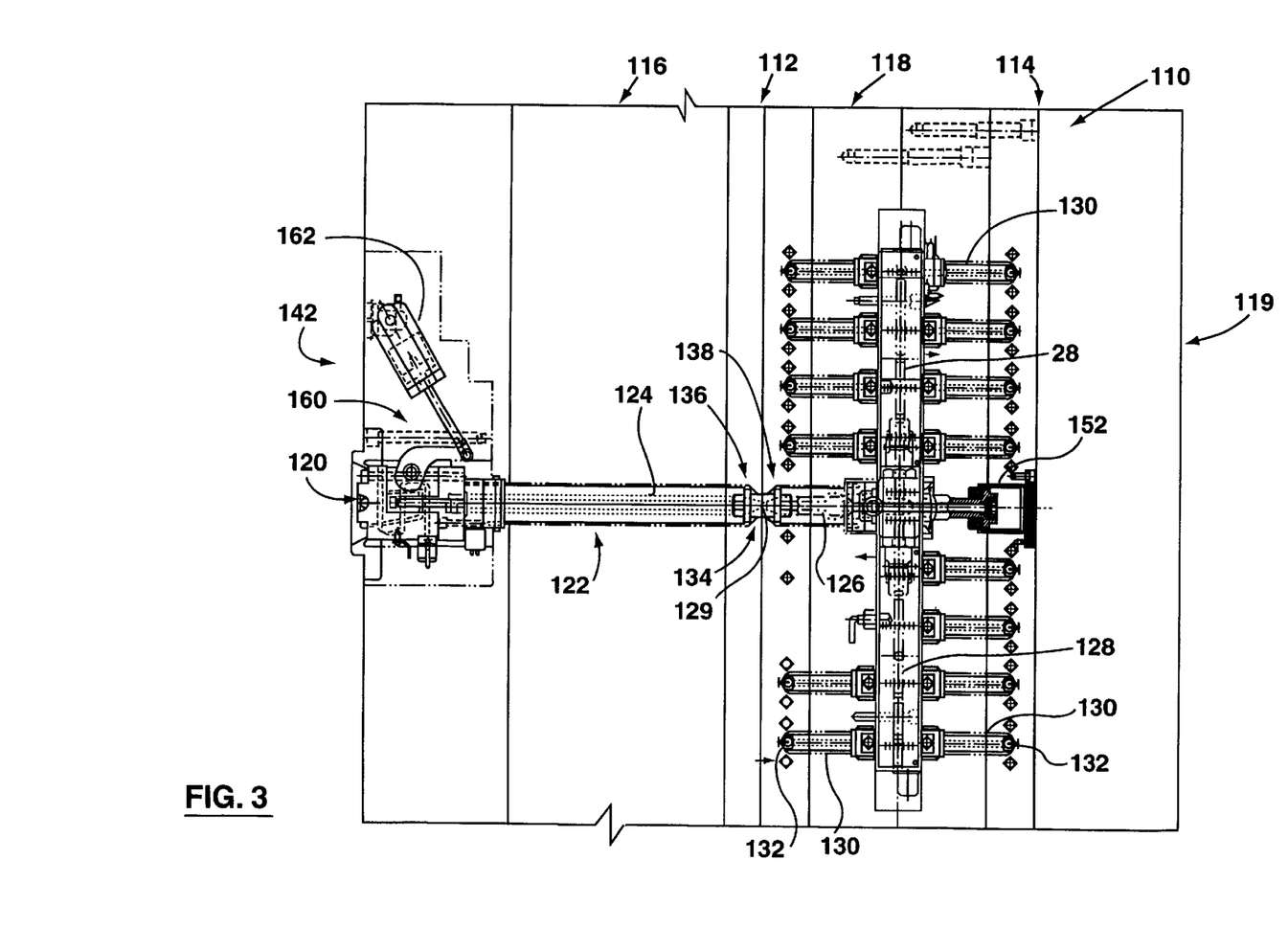
FIG. 3 is a sectional view of a second embodiment of drool control apparatus for a stack mold according to the present invention.

Referring to FIG. 3, a stack mold (or multi-level mold) having a melt runner system incorporating a second embodiment of the present invention is shown generally at 110. Mold 110 has a plurality of cavities (now shown), located on a first parting line 112 and second parting line 114. The first parting line 112 extends between a stationary platen 116 and a central moving platen 118 and the second parting line 114 extends between the central moving platen 118 and a secondary moving platen 119. Stack mold runner designs of this type are well known in the art, as described in U.S. Pat. Nos. 4,212,626 and 4,244,909 to Gellert, both of which are incorporated herein by reference.

A molding machine inlet 120 in the stationary platen 116 accepts the nozzle of an injection molding machine (not shown). In communication with molding machine inlet 120 is a heated runner system 122, which is heated by any means known in the art sufficient to maintain the melt therein at a desired temperature. Runner system 122 comprises a first runner passage 124, in stationary platen 116, and a second runner passage 126, in central moving platen 118, in communication with a runner manifold 128. Runner passages 124 and 126 communicate via gates 129. Runner manifold 128 communicates with each mold cavity via a nozzle 130 having a thermal-gated mold cavity gate 132.

Positioned between first and second runner passages 124 and 126, along first parting line 112, is a melt control valve assembly 134, comprising a first flow control valve unit 136 in stationary platen 116 and a second flow control valve unit 138 in central moving platen 118. The design and operation of melt control valve assembly 134 are more fully described in U.S. Pat. Nos. 4,212,626 and 4,244,909.

Figure 4:
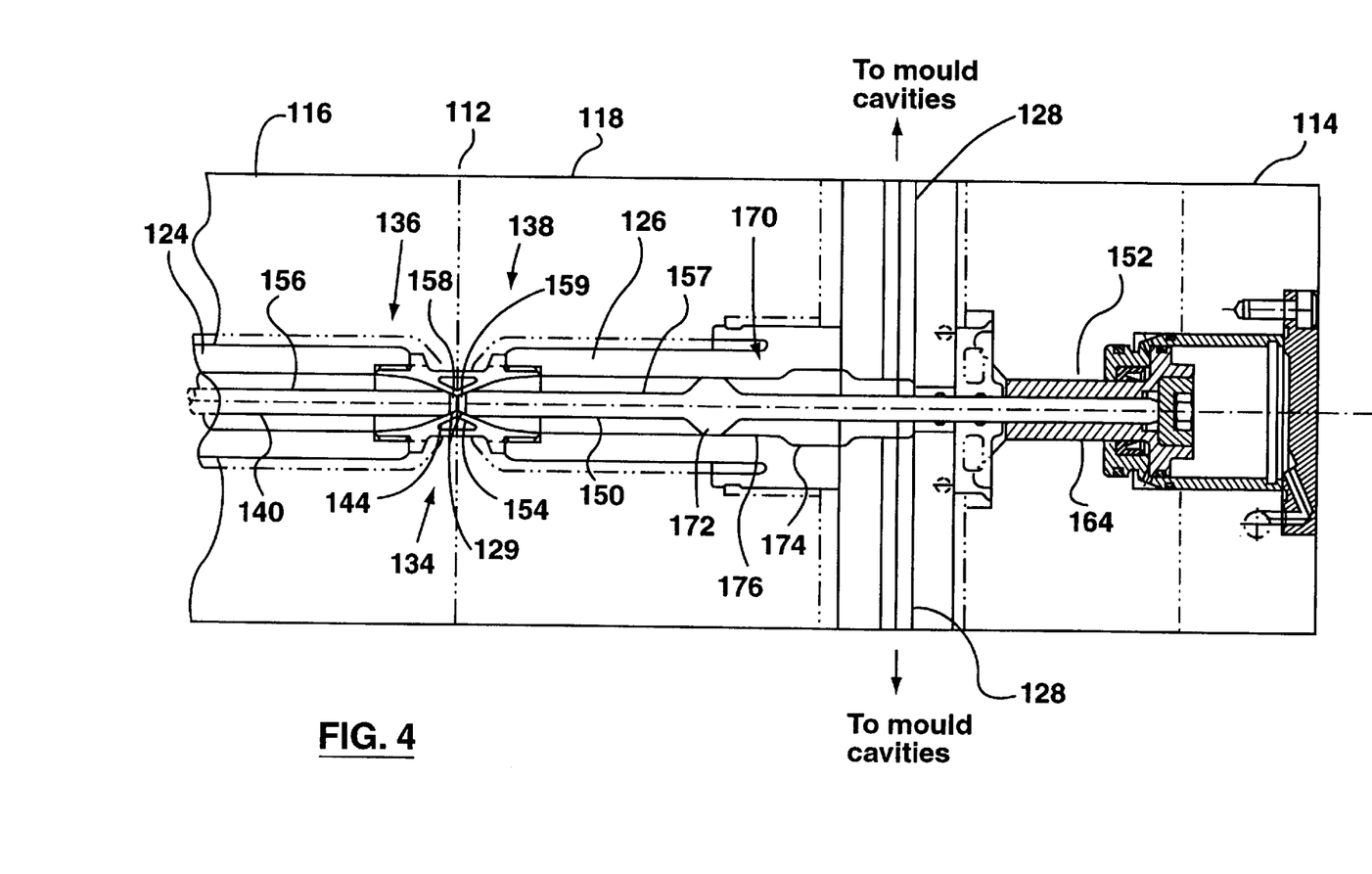
FIG. 4 is an enlarged sectional view of the drool control apparatus of FIG. 3, shown in a first position.

Referring to FIG. 4, first flow control valve unit 136 comprises a first valve pin 140, actuated by a first valve pin actuator 142 (see FIG. 3), and a first valve seat 144. Likewise, second flow control valve unit 138 comprises a second valve pin 150, actuated by a second valve pin actuator 152, and a second valve seat 154. First and second valve pins 140 and 150 respectively have stems 156, 157 and bevelled tips 158, 159. First valve actuator 142 comprises a cam and lever 160 actuated by a piston and cylinder assembly 162. Second valve actuator 152 comprises an axial piston and cylinder assembly 164. First and second actuators 142 and 152 are controlled, synchronized and actuated by the molding machines central procession unit (CPU) (not shown). As is well known in the art, the CPU synchronizes actuation with mold parting and injection cycles, as further described below.

Positioned within central moving platen 118 is a second embodiment of drool control assembly 170, comprising piston 172 (also referred to herein as compression member) and bypass chamber 174, being an enlarged section of second runner passage 126. Piston 172 is integrally incorporated in the second valve pin 150 and positioned on stem 157 such that piston 172 is positionable, in a compression position, in a compression zone 176 of second runner passage 126 and, in a bypass position, in by-pass chamber 164.

For reasons which will become apparent below, piston 172, compression zone 176 and by-pass chamber 174 are shaped and sized to substantially block second runner passage 126 in its compression position but permit melt flow therearound when piston 172 is in its bypass position in by-pass chamber 174, as described below. Piston 172 and bypass chamber 174 preferably each have a corresponding tapered profile to allow a relatively non-turbulent flow of melt around the piston 172 while in the bypass position.

Figure 5:
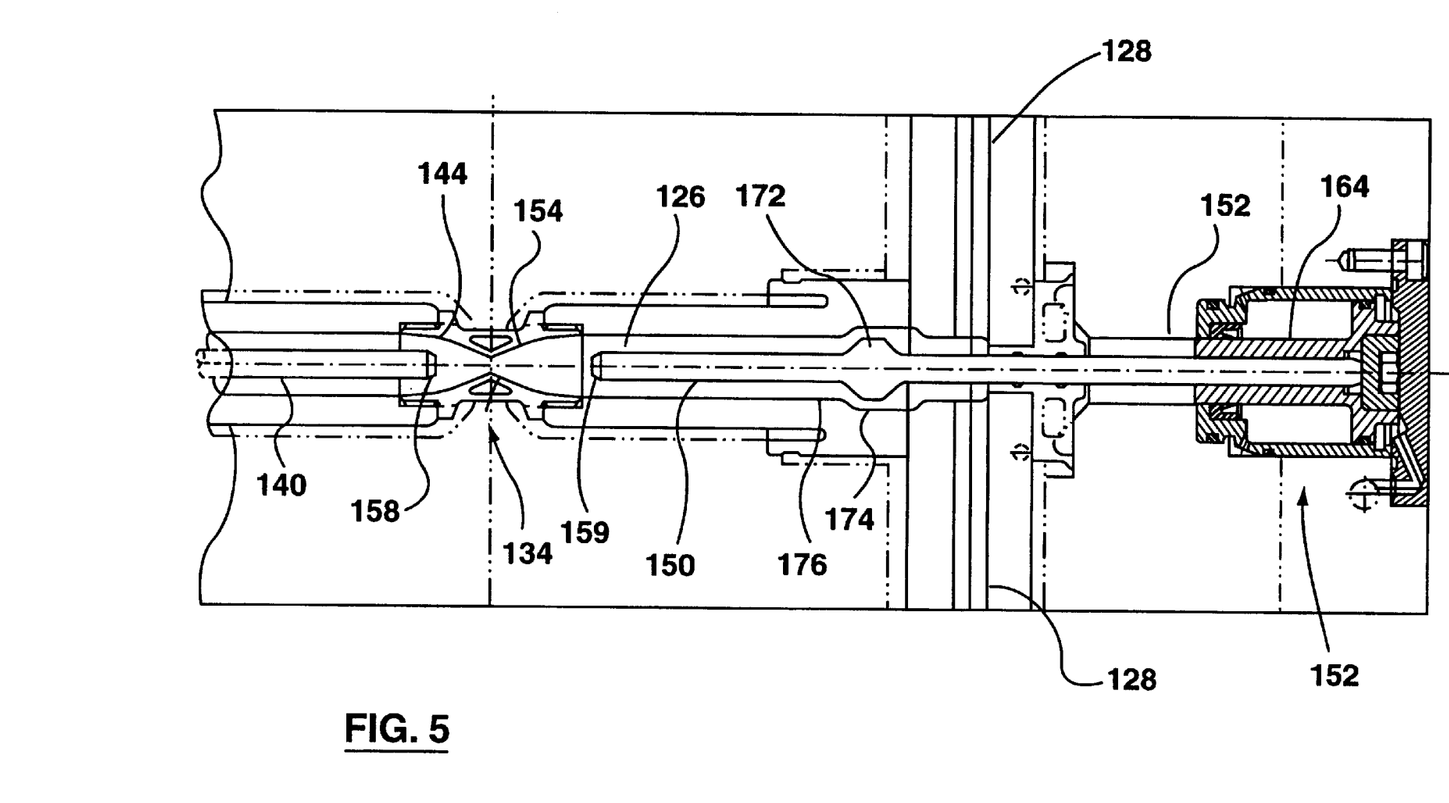
FIG. 5 is the sectional view of the drool control apparatus of FIG. 4, shown in a second position.

The operation of drool control assembly 170 is synchronized with mold injection as will now be described. Referring to FIG. 5 the CPU actuates actuators 142 and 152, and thus piston and cylinder assemblies 162 and 164, to move first and second valve pins 140 and 150 to their respective "open" positions, with tip 158 of first valve pin 140 withdrawn from first seat 144 and tip 159 of second valve pin 150 withdrawn from second seat 154. In this position, piston 172 is positioned in by-pass chamber 74. When so positioned, melt is permitted to flow from the molding machine sequentially through first runner passage 24, melt control valve assembly 134, second runner passage 126, around piston 172 through by-pass chamber 74 and into manifold 128, for delivery to the mold cavities. Once the mold cavities are filled, the molding pressure is maintained to apply a packing pressure, as is known in the art.

Figure 6:
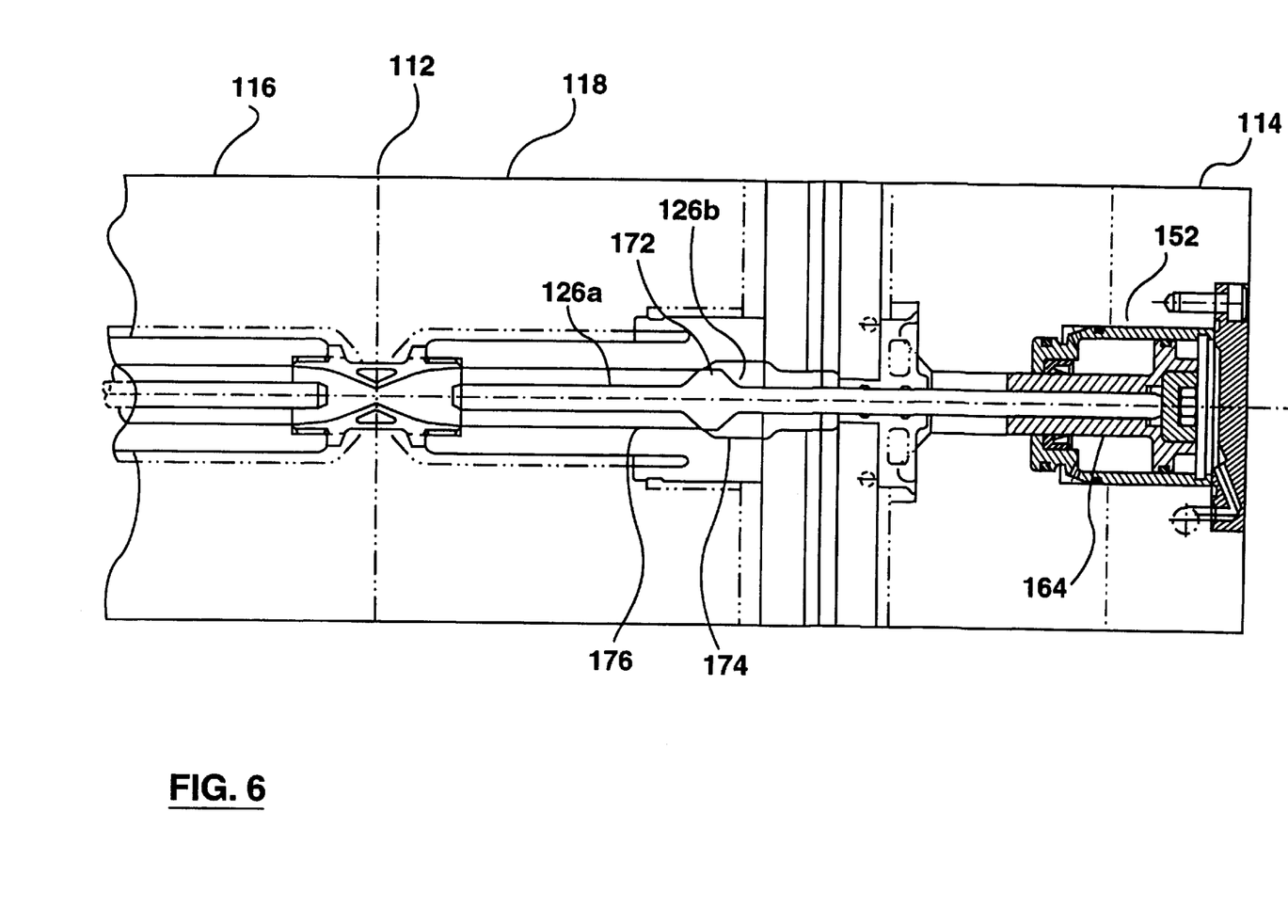
FIG. 6 is the sectional view of the drool control apparatus of FIG. 4, shown in the third position.
Figure 7:
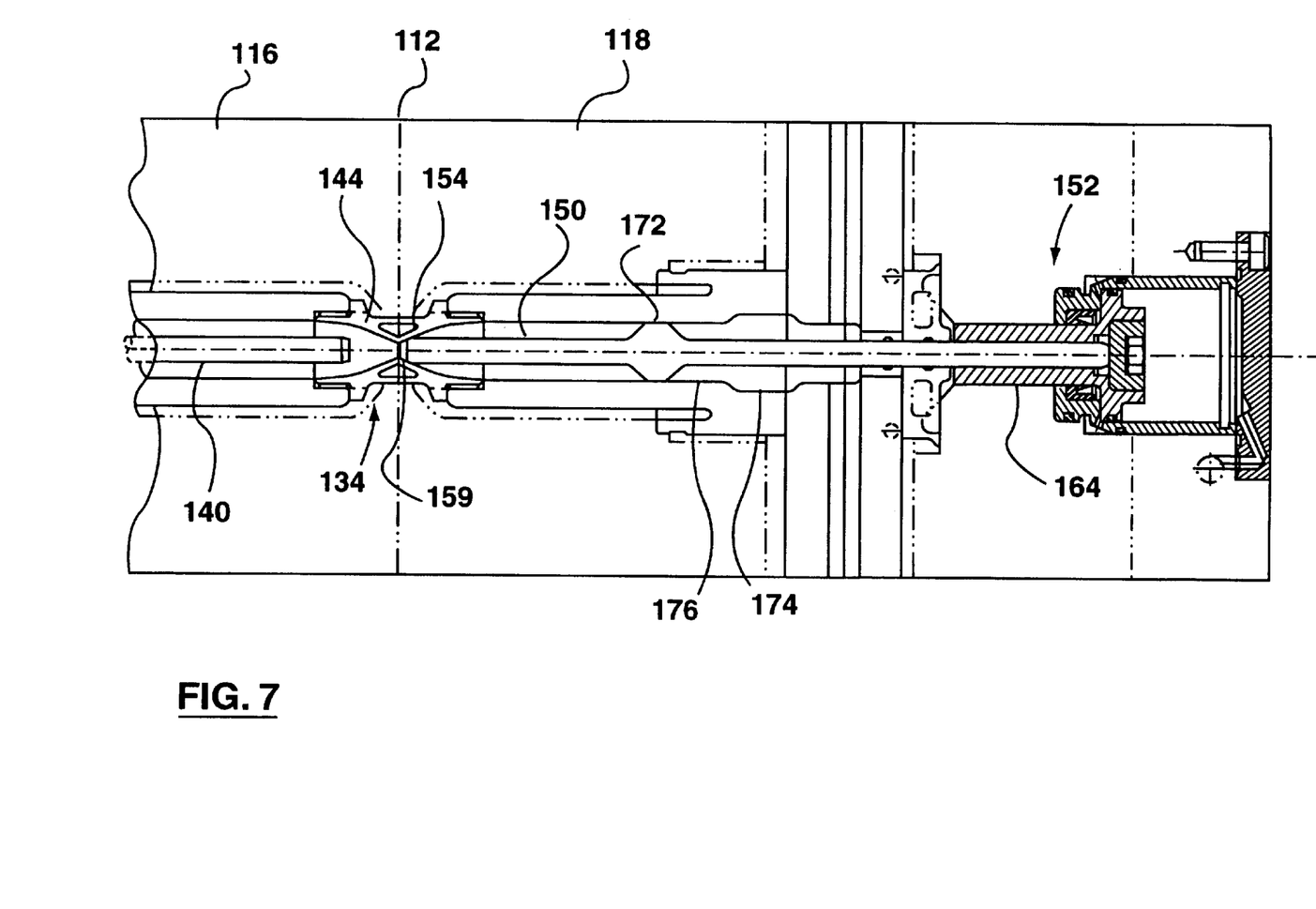
FIG. 7 is the sectional view of the drool control apparatus of FIG. 4, shown in a fourth position.

Referring to FIG. 6, upon completion of the packing phase, the CPU actuates piston and cylinder assembly 164 to move second valve pin 150 and piston 172 "upstream" (ie. towards the molding machine and away from the mold cavities), thereby causing piston 172 to enter compression zone 176. Upon such movement of piston 172 into compression zone 176, the melt material in the second melt passage on the upstream side 126a of piston 172 is forced back into compression zone 176, along second runner passage 126 in the upstream direction. Referring to FIG. 7, as piston 172 travels upstream through compression zone 176, a pressure drop is created in the melt material immediately behind (ie "downstream" 126b from) piston 172, which pressure drop is correspondingly transmitted to manifold 128 and, ultimately, to mold cavity gates 132. As second valve pin 150 moves to its full-stroke or "closed" position, tip 159 of second valve pin 150 seats in seat 154 to close the downstream half of melt control valve assembly 134. It will be understood that the stroke length of piston 172 is chosen to obtain the desired pressure drop in the runner system of central moving platen 118 to achieve the intended anti-drool performance.

Figure 8:
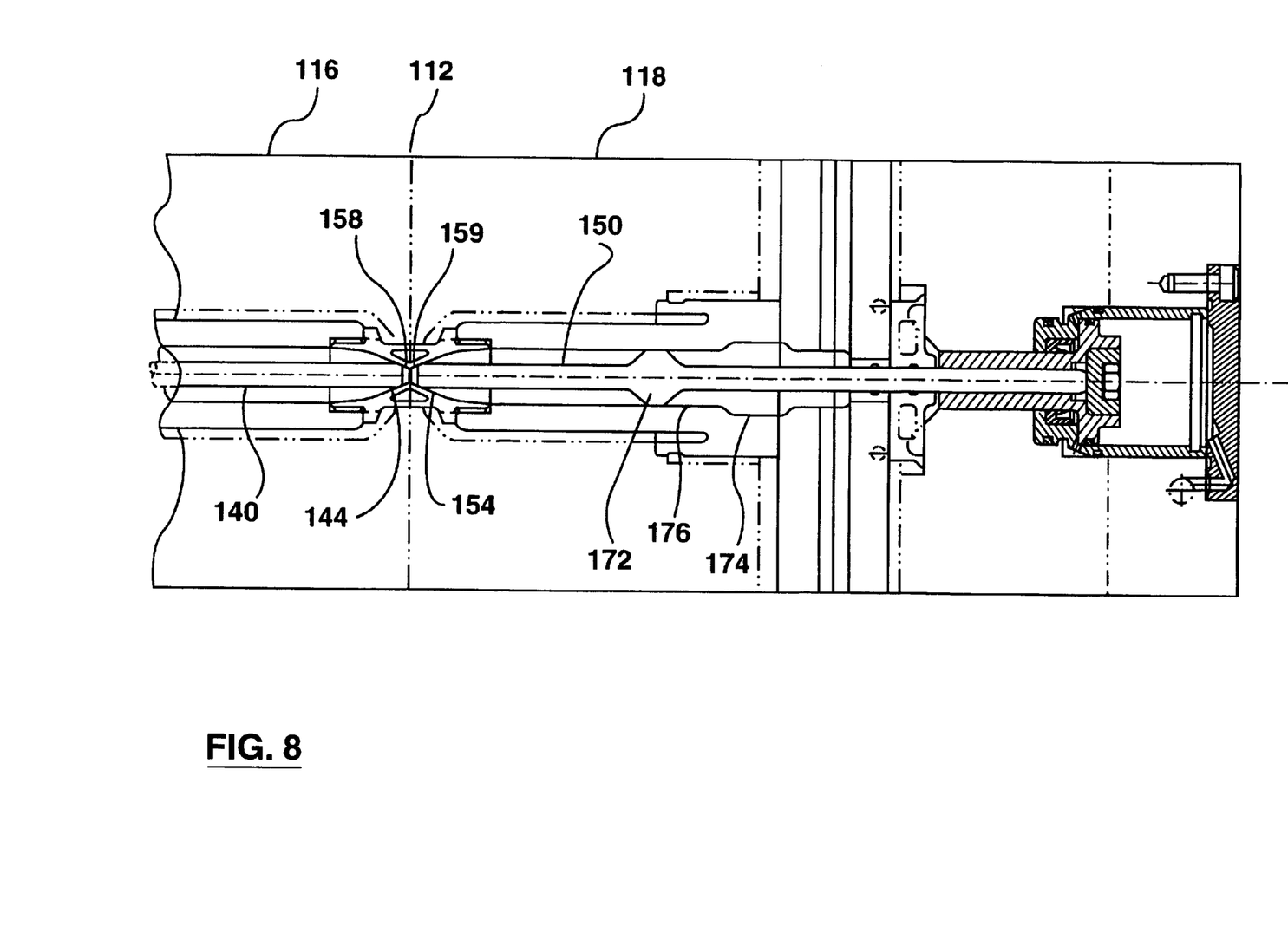
FIG. 8 is the sectional view of the drool control apparatus of FIG. 4, shown in fifth position.
Figure 9:
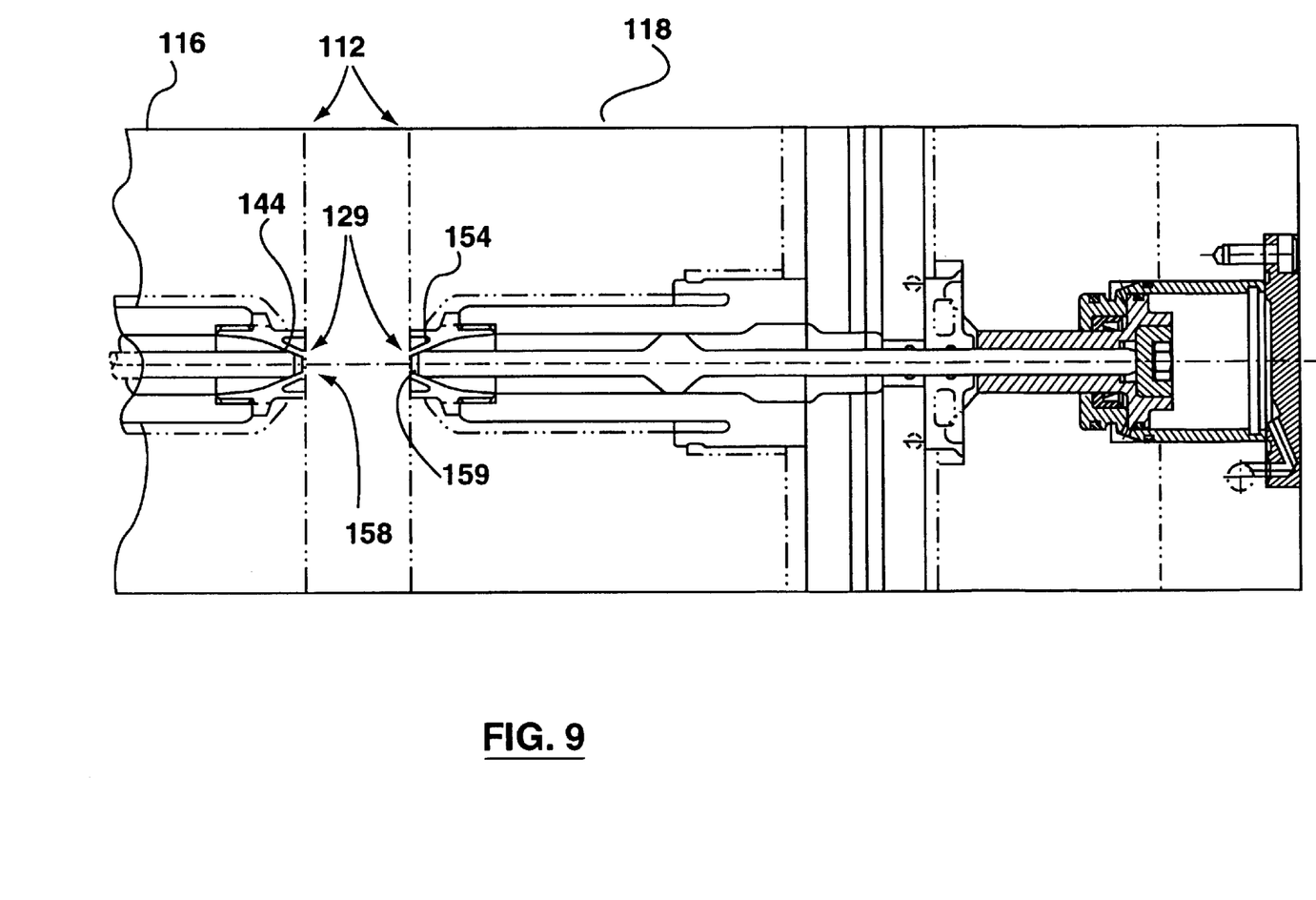
FIG. 9 is the sectional view of the drool control apparatus of FIG. 4, shown in a sixth position.

Referring to FIG. 8, once second valve pin 150 is in its "closed" position, the CPU actuates first actuator 142 to move first valve pin 140 to its "closed" position, with tip 158 fully seated in seat 144. Melt control valve assembly 134 is now fully closed. Mold 110 may now be opened (under control of the CPU), along first parting line 112, as shown in FIG. 9, and along second parting line 114 to permit the molded parts to be ejected from mold 110. The closed first and second valve pins 140 and 150 prevent drool at the melt control valve assembly 134. Further, by means of the pressure drop imparted by the drool control assembly 170, the decompressed melt in manifold 128 advantageously reduces the tendency of the melt to drool from the cavity gates 132.

Figures 10, 11:
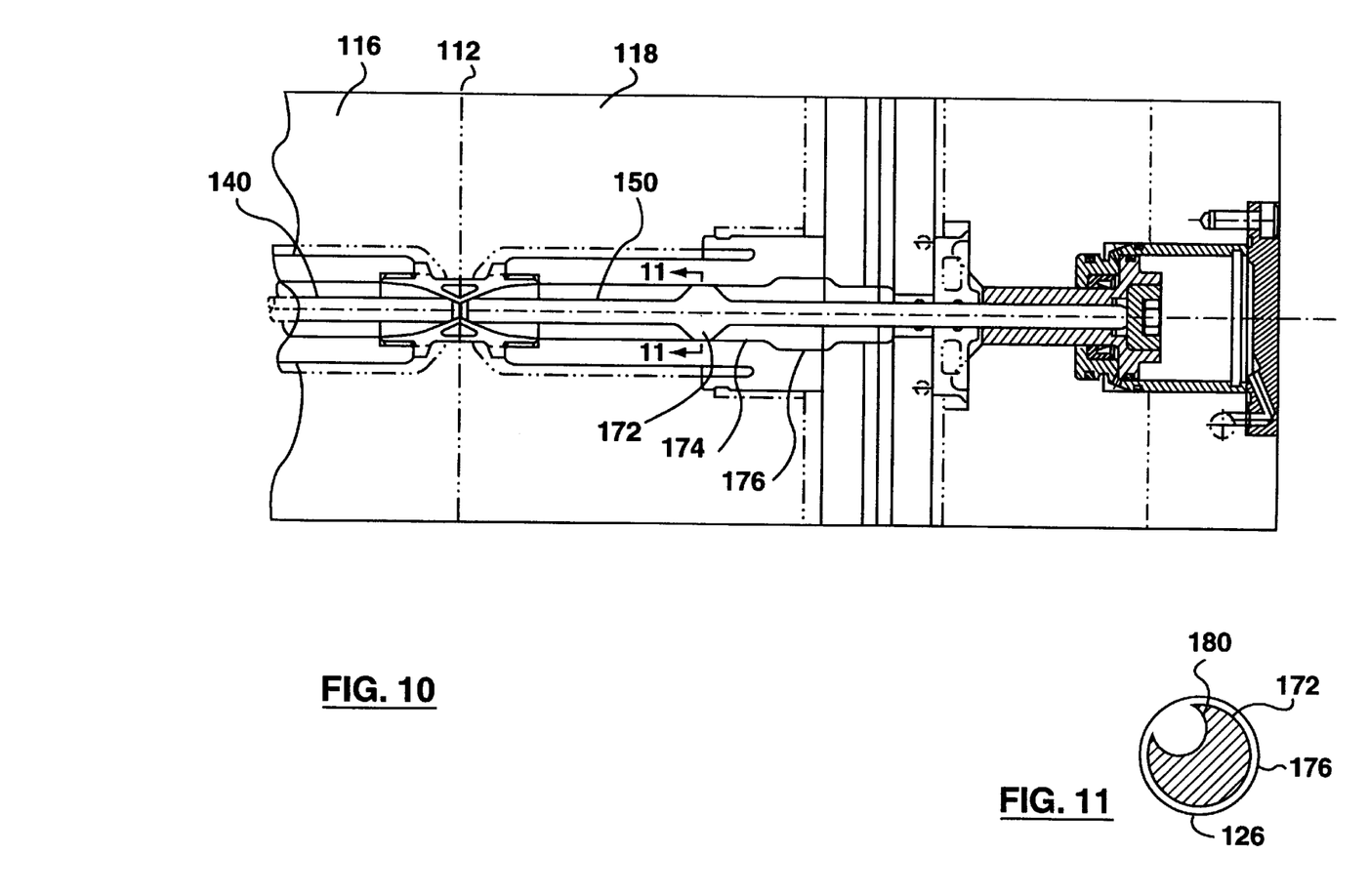
FIG. 10 is the sectional view of the drool control apparatus of FIG. 4, shown again in its first position.
FIG. 11 is a sectional view of the drool control apparatus of FIG. 4, taken along line 11—11.

Once the molded parts have been ejected from the mold, the mold may be closed, as shown in FIG. 10, and the molding machine readied for the next molding cycle.

Referring to FIG. 11, in the preferred embodiment, piston 172 has a substantially identical, but slightly smaller, cross-section to second runner passage 126, but also has a longitudinal cutout 180 through its thickness. Cutout 180 permits some melt to flow past piston 172 as it is stroked upstream the compression zone 176, thereby reducing the resistance pressure the upstream melt exerts on piston 172. Thus, cutout 180 advantageously allows the size of piston and cylinder assembly 162 to be reduced. The size and shaped of cutout 180 can be turned to a particular molding application to optimize decompression performance in the stack mold manifold, as will be apparent to one skilled in the art.

Advantageously, the internal dimensions of the runner passage 126 (length and width) remain constant as the melt is decompressed. Mechanisms are thus not required to vary the dimensional characteristics of the runner passage 126 to achieve the desired decompression.

Although it is desirable to actuate drool control assembly 170 prior to parting the mold, so that the melt material displaced upstream of piston 172 by the actuation of assembly 170 may return into first runner passage 122, it will also be understood that drool control assembly 170 may also be configured to actuate contemporaneously with the parting of the mold, provided that a suitable bleed arrangement, as will be understood by one skilled in the art, is made for the upstream melt displaced by the stroke of piston 172 in second runner passage 126.

The term "piston" as described in this application need not be a piston in the conventional sense, but may be any body capable of moving melt upstream in the runner system to effect a decompression downstream of the body.

While the above description constitutes the preferred embodiment, it will be appreciated that the present invention is susceptible to modification and change without parting from the fair meaning of the proper scope of the accompanying claims.

What is claimed is:

1. A method of controlling nozzle gate drool in a multi-nozzle molding apparatus comprising the steps of:
    (a) introducing a flow of pressurized melt to a runner passage in a mold for subsequent transfer;
    (b) transferring said flow of pressurized melt to a plurality of thermally-gated injection molding nozzles via a plurality of secondary melt passages branching from said runner passage;
    (c) injecting the flow from said nozzles into at least one cavity to perform a molding operation;
    (d) upon completion of said molding operation, moving a body in said runner passage from a bypass chamber, where pressurized melt is permitted to bypass said body, to a compression zone, where said flow of pressurized melt is at least partially impeded by said body portion;
    (e) moving said body upstream in said compression zone to create a pressure drop downstream of said body to impede drool at said thermally-gated injection molding nozzles; and
    (f) opening said mold to eject molded pieces.

2. The method of claim 1 wherein said runner passage has a length and a width and the length and width remain constant as the melt is decompressed.

3. The method of claim 1 further comprising the step of sealing an upstream end of said runner with a valve portion of said body prior to opening said mold.

4. The method of claim 3 wherein said step of sealing said runner passage is performed after said step of moving said body upstream in said compression zone.

5. A method of controlling gate drool in a molding apparatus comprising the steps of:
    (a) introducing a flow of pressurized melt to a runner passage in a mold for subsequent transfer through a gate to at least one molding cavity to perform a molding operation;
    (b) upon completion of said molding operation, moving a body in said runner passage from a bypass chamber, where pressurized melt is permitted to bypass said body, to a compression zone, wherein said flow of pressurized melt is at least partially impeded by said body portion;
    (c) moving said body upstream in said compression zone to create a pressure drop downstream of said body to impede drool at said gate;
    (d) sealing an upstream end of said runner with a valve portion of said body prior to opening said mold and after said step of moving said body upstream in said compression zone, and
    (e) opening said mold to eject a molded piece.

6. A drool control apparatus for a hot runner injection molding apparatus, the drool control apparatus comprising:
    a primary melt passage in a manifold, said primary melt passage having a first end for receiving a pressurized melt and a second end, said second end branching to communicate with a plurality of thermally-gated injection molding nozzles via a plurality of secondary melt passages;
    a body disposed in the primary melt passage; and
    body moving means for moving said body in said primary melt passage between a first position, where said melt is permitted to bypass said body, to a second position upstream of said first position, wherein said body moving means is disposed at least partially in said primary melt passage and wherein said body and said primary melt passage are adapted to decompress said melt downstream of said body to control drool at said plurality of nozzles when said body is moved from said first position to said second position.

7. The drool control apparatus of claim 6 wherein said primary melt passage is heated.

8. The drool control apparatus of claim 6 wherein said body moving means comprise an actuator aligned with said primary melt passage and a shaft aligned centrally in said primary melt passage, said shaft extending between said actuator and said body.

9. The drool control apparatus of claim 6 wherein said body moving means are disposed at least partially in an enlarged portion of said primary melt passage and said primary melt passage is adapted to permit a constant flow rate of said heated pressurized melt past said body moving means when said body is in said bypass position.

10. A drool control apparatus for a hot runner injection molding apparatus, the drool control apparatus comprising:
    a primary melt passage in a manifold, said primary melt passage having a first end for receiving a pressurized melt and a second end, said second end branching to communicate with a plurality of thermally-gated injection molding nozzles via a plurality of secondary melt passages; and
    a body disposed in a said primary melt passage and moveable between a first position, where said flow of pressurized melt is permitted to bypass said body, and a second position upstream in said primary melt passage of said first position, said body and said primary melt passage being adapted to create a pressure drop downstream of said body to control drool at said plurality of nozzles when said body is moved from said first position to said second position.

11. The drool control apparatus of claim 10 wherein said first position and second position are spaced apart a distance adapted to substantially prevent drool at said plurality of injection molding nozzles.

12. The drool control apparatus of claim 11 wherein said distance is adjustable to vary said pressure drop.

13. The drool control apparatus of claim 10 wherein said flow of pressurized melt is substantially impeded by said body when in said second position.

14. The drool control apparatus of claim 10 wherein said primary melt passage has a volume which is substantially constant irrespective of said body position in said melt passage.

15. The drool control apparatus of claim 10 wherein said primary melt passage includes a bypass chamber corresponding to said first position, and a compression zone between said first and second positions, and wherein said bypass chamber has a diameter greater than a diameter of said compression zone.

16. The drool control apparatus of claim 10 wherein said body further comprises a shaft member adapted to connect said body to an actuator for moving said body, said shaft member being disposed at least partially in said melt passage.

17. The drool control apparatus of claim 10 wherein said body is mounted to a valve unit, and wherein said valve unit substantially seals said first end of said melt passage when said body is in said second position.

18. A hot runner injection molding apparatus comprising:
   a plurality of thermally-gated injection molding nozzles;
   a manifold having a primary melt passage and a plurality of secondary melt passages, said primary melt passage having a first end for receiving a pressurized melt and a second end, said second end branching to communicate with a plurality of thermally-gated injection molding nozzles via a plurality of secondary melt passages;
   a body disposed in the primary melt passage; and
   body moving means for moving said body in said primary melt passage between a first position, where said melt is permitted to bypass said body, to a second position upstream of said first position, wherein said body moving means is disposed at least partially in said primary melt passage and wherein said body and said primary melt passage are adapted to create a pressure drop downstream of said body to control drool at said plurality of nozzles when said body is moved in said primary melt passage from said first position to said second position.

19. The hot runner injection molding apparatus of claim 18 wherein said drool control apparatus is disposed in said mold.

20. The hot runner injection molding apparatus of claim 19 wherein said melt passage includes a bypass chamber corresponding to said first position, and a compression zone between said first and second positions, and wherein said bypass chamber has a diameter greater than a diameter of said compression zone.

21. A drool control apparatus for an injection molding apparatus, said drool control apparatus comprising:
   a melt passage having a upstream end and downstream end; and
   a body moveable between a first position in said melt passage, where a flow of pressurized melt is permitted to bypass said body, and a second position upstream in said melt passage of said first position, said body and said melt passage being adapted to create a pressure drop downstream of said body to control drool at at least one nozzle when said body is moved from said first position to said second position, said body being adapted to permit at least some pressurized melt to flow therepast irrespective of said body position in said melt passage.

22. A stack injection molding apparatus having a stationary platen and at least one moving platen, said at least one moving platen moveable between an open position and a closed position, said molding apparatus comprising:
   a first runner passage in said stationary platen adapted to deliver a flow of pressurized melt to said at least one moving platen;
   a second runner passage in said at least one moving platen having a first end in communication with said first runner passage when said at least one moving platen is in said closed position, and a second end, said second end branching to communicate with a plurality of thermally-gated nozzles via a plurality of tertiary melt passages;
   a valve unit disposed in said moving platen, said valve unit having a body portion disposed in said second runner passage, said body portion of said valve unit moveable between a first position, where said flow of pressurized melt is permitted to bypass said body portion, and a second position upstream in said second runner passage of said first position, said body portion and said melt passage being adapted to create a pressure drop downstream of said body portion to control drool at said plurality of injection molding nozzles when said body is moved from said first position to said second position.

23. The stack injection molding apparatus of claim 22 wherein said valve unit substantially seals said first end of said second runner passage when said body portion of said valve unit is in said second position.

24. The drool control apparatus of claim 22 wherein said second runner passage has a volume which is substantially constant irrespective of said body position in said second runner passage.

25. A drool control apparatus for a hot runner injection molding apparatus, the drool control apparatus comprising:
   an inlet melt passage in a manifold, said inlet melt passage having a first end for receiving a pressurized melt and a second end, said second end branching to communicate with a plurality of thermally-gated injection molding nozzles via a plurality of secondary melt passages;
   a single body disposed in the inlet melt passage; and
   body moving means for moving said body in a direction along said inlet melt passage between a first position, to a second position upstream of said first position, and wherein said inlet melt passage has a bypass chamber so that melt may bypass said body when said body is located in said first position and wherein said body and said inlet melt passage are adapted to decompress said melt downstream of said body to control drool at said plurality of nozzles when said body is moved from said first position to said second position.

26. The drool control apparatus of claim 25 wherein said inlet melt passage comprises a compression zone having a first diameter and said body has a first body portion having a diameter which is adapted to be closely received within said first diameter of said compression zone.

27. The drool control apparatus of claim 26 wherein said body moving means comprises a single motive means to create decompression in said hot runner injection molding apparatus.

* * * * *